United States Patent
Sakaki

(10) Patent No.: US 10,218,468 B2
(45) Date of Patent: Feb. 26, 2019

(54) USB DEVICE, DATA TRANSFER SYSTEM AND DATA TRANSFER METHOD

(71) Applicant: Renesas Electronics Corporation, Koutou-ku, Tokyo (JP)

(72) Inventor: Makoto Sakaki, Tokyo (JP)

(73) Assignee: Renesas Electonics Corporation, Tokyo (JP)

( * ) Notice: Subject to any disclaimer, the term of this patent is extended or adjusted under 35 U.S.C. 154(b) by 45 days.

(21) Appl. No.: 15/640,472

(22) Filed: Jul. 1, 2017

(65) Prior Publication Data

US 2018/0076933 A1      Mar. 15, 2018

(30) Foreign Application Priority Data

Sep. 14, 2016   (JP) .................................. 2016-179288

(51) Int. Cl.
| | |
|---|---|
| *H04L 1/08* | (2006.01) |
| *H04L 1/00* | (2006.01) |
| *G06F 13/38* | (2006.01) |
| *G06F 13/42* | (2006.01) |
| *H04L 29/06* | (2006.01) |

(52) U.S. Cl.
CPC .............. *H04L 1/08* (2013.01); *G06F 13/385* (2013.01); *G06F 13/4295* (2013.01); *H04L 1/0061* (2013.01); *H04L 69/22* (2013.01)

(58) Field of Classification Search
CPC ....................................................... H04L 1/08
See application file for complete search history.

(56) References Cited

U.S. PATENT DOCUMENTS

| | | | | |
|---|---|---|---|---|
| 7,869,428 | B2 * | 1/2011 | Shake | ........................ H04L 1/08 370/389 |
| 2016/0380868 | A1 * | 12/2016 | Hollis | ..................... H04L 47/10 370/252 |
| 2017/0286343 | A1 * | 10/2017 | Rozic | .................... G06F 13/385 |
| 2018/0176903 | A1 * | 6/2018 | Lee | ........................... H04L 1/18 |

OTHER PUBLICATIONS

Universal Serial Bus 3.1 Specification Revision 1.0, Jul. 26, 2013.*
Universal Serial Bus 3.1 Specification Revision.1.0, Chapters 7 and 8.

* cited by examiner

*Primary Examiner* — Steve N Nguyen
(74) *Attorney, Agent, or Firm* — Shapiro, Gabor and Rosenberger, PLLC

(57) ABSTRACT

To prevent an increase in a circuit configuration that is used for a case in which when a header is incorrect under a specific condition, a correctly-received payload is kept and only the header is resent. A USB device according to the present disclosure includes a first processing unit configured to, when a predetermined error is included in a first header of a first packet received from a host apparatus, discard the first header and transmit a first payload of the first packet to a subsequent stage, and a second processing unit configured to discard the first payload received from the first processing unit and transmit a first packet resending request to the host apparatus.

10 Claims, 14 Drawing Sheets

USB DEVICE, DATA TRANSFER SYSTEM AND DATA TRANSFER METHOD

CROSS-REFERENCE TO RELATED APPLICATIONS

This application is based upon and claims the benefit of priority from Japanese patent application No. 2016-179288, filed on Sep. 14, 2016, the disclosure of which is incorporated herein in its entirety by reference.

BACKGROUND

The present disclosure relates to a device, a data transfer system, and a data transfer method, and for example to a device, a data transfer system, and a data transfer method in conformity with USB (Universal Serial Bus) 3.1 Gen 2.

A data packet (DP) in an OUT transfer of the USB 3.1 Gen 1 (USB 3.0) is composed of two packets, i.e., a data packet header (DPH) and a data packet payload (DPP). Further, the transfer of the DP is performed in the order of the DPH and the DPP.

Here, in the USB 3.1 Gen 1, if some kind of packet error occurs in the DPH, the pair of the DPH and DPP is discarded in a link layer of a USB device. Therefore, since a protocol layer of the USB device does not receive a packet related to the error, no process that is performed when a packet error occurs is necessary in the protocol layer.

Further, In USB 3.1 Gen 2, which is a specification succeeding the USB 3.1 Gen 1, a Length Field Replica field is added in the DPH. Further, the specification is changed so that when a CRC value in the DPH is an erroneous value and the Length Field Replica field has a correct value, only the DPH is discarded in the link layer and the corresponding DPP is sent to the protocol layer (Universal Serial Bus 3.1 Specification Revision.1.0, Chapter 7 and 8).

SUMMARY

However, the present inventors have found the following problem. That is, there is a problem in Universal Serial Bus 3.1 Specification Revision.1.0, Chapters 7 and 8 that it requires a circuit configuration for coping with a case in which when the DPH is incorrect under a specific condition, the correctly-received DPP is kept and only the DPH is sent again.

Other objects and novel features will be more apparent from the following description in the specification and the accompanying drawings.

According to one embodiment, a USB device includes: a first processing unit configured to, when a predetermined error is included in a header of a packet received from a host apparatus, discard the header and transmits a payload of the packet to a subsequent stage; and a second processing unit configured to discard the received payload and transmits a packet resending request to the host apparatus.

According to the above-described embodiment, it is possible to prevent or reduce an increase in the circuit size.

BRIEF DESCRIPTION OF THE DRAWINGS

The above and other aspects, advantages and features will be more apparent from the following description of certain embodiments taken in conjunction with the accompanying drawings, in which.

DETAILED DESCRIPTION

Specific embodiments to which the above-described means for solving the program is applied are explained hereinafter in detail with reference to the drawings. The same symbols are assigned to the same components throughout the drawings, and duplicated explanation thereof is omitted as appropriate for clarifying the explanation.

In the following embodiments, when necessary, the present disclosure is explained by using separate sections or separate embodiments. However, those embodiments are not unrelated with each other, unless otherwise specified. That is, they are related in such a manner that one embodiment is a modified example, an application example, a detailed example, or a supplementary example of a part or the whole of another embodiment. Further, in the following embodiments, when the number of elements or the like (including numbers, values, quantities, ranges, and the like) is mentioned, the number is not limited to that specific number except for cases where the number is explicitly specified or the number is obviously limited to a specific number based on its principle. That is, a larger number or a smaller number than the specific number may be also used.

Further, in the following embodiments, their components (including operation steps and the like) are not necessarily indispensable except for cases where the component is explicitly specified or the component is obviously indispensable based on its principle. Similarly, in the following embodiments, when a shape, a position relation, or the like of a component(s) or the like is mentioned, shapes or the likes that are substantially similar to or resemble that shape are also included in that shape except for cases where it is explicitly specified or they are eliminated based on its principle. This is also true for the above-described number or the like (including numbers, values, quantities, ranges, and the like).

Figure 13:
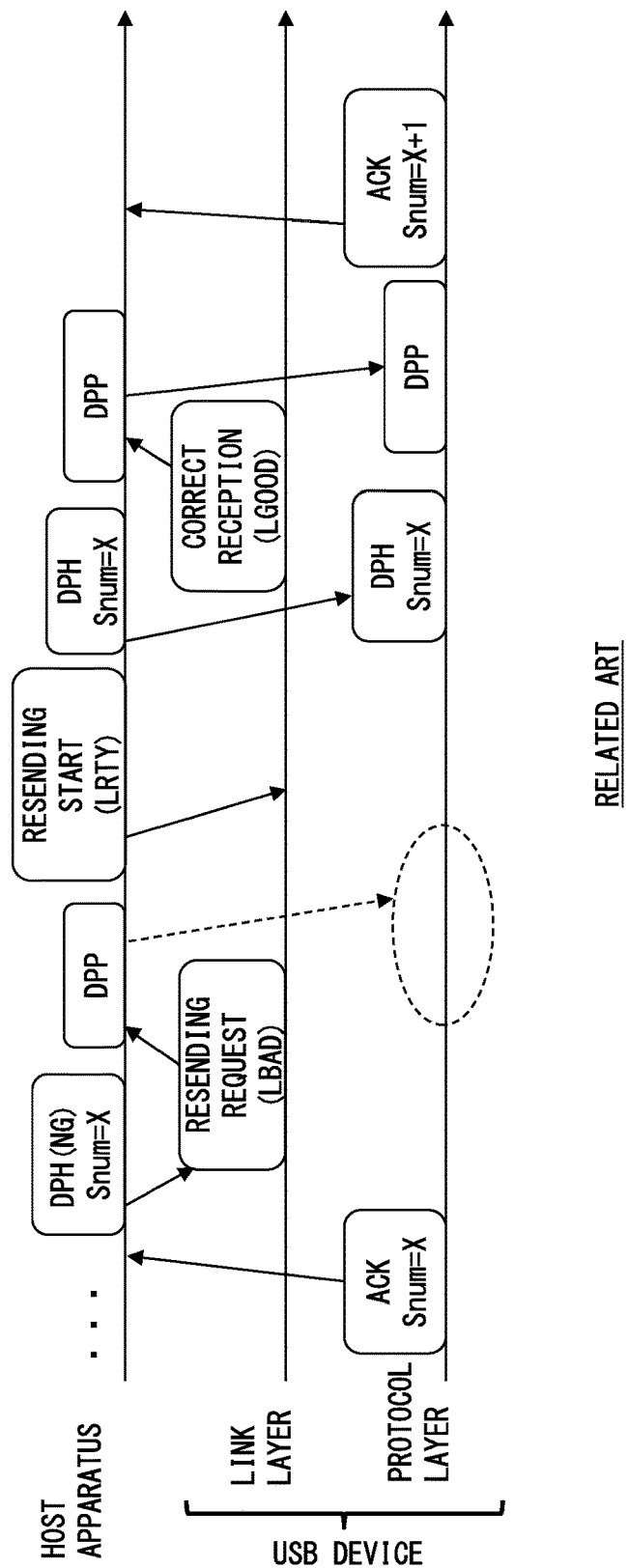
FIG. 13 is a sequence diagram showing a process flow in each layer when a CRC error occurs in a DPH in USB 3.1 Gen 1.

Details of how the inventor arrived at the below-shown embodiments are explained hereinafter. Firstly, a process flow in each layer that is performed when a CRC error occurs in a DPH in the USB 3.1 Gen 1, which is the specification preceding the USB 3.1 Gen 2, is explained with reference to a sequence diagram shown in FIG. 13. In this example, an operation that starts in the middle of a Bulk OUT transfer in conformity with the USB 3.1 Gen 1 is shown. That is, it is assumed that a USB device has already received DPs correctly up to a DP having a sequence number (Snum) X-1 (Snum=X-1) transmitted from a host apparatus.

Therefore, firstly, a protocol layer of the USB device transmits an ACK (Snum=X) to the host apparatus. In response to this, the host apparatus transmits a DPH and a DPP having a Snum X (Snum=X) to the USB device. Then, the USB device receives the DPH having the Snum X (Snum=X) in its physical layer and link layer. It is assumed that at this point, a CRC error is detected in the received DPH. Therefore, the link layer in conformity with the USB 3.1 Gen 1 discards the DPH and also discards the DPP having the Snum X (Snum=X), which is received subsequent to the DPH. Note that this link layer does not transfer the DPH and DPP having the Snum X (Snum=X) to a protocol layer of a subsequent stage. Further, this link layer transmits an LBAD command to the host apparatus as a DPH resending request.

Upon receiving the LBAD command, the host apparatus transmits an LRTY command to the USB device. Note that the USB device ignores data transmitted from the host apparatus until the USB device receives the LRTY command from the host apparatus. After transmitting the LRTY command, the host apparatus transmits the DPH and DPP having the Snum X (Snum=X) to the USB device again. When the received DPH is correct, the link layer of the USB device transmits an LGOOD command to the host apparatus and transfers the DPH and DPP having the Snum X (Snum=X) to the protocol layer. When the protocol layer of the USB device correctly receives the DPH and DPP having the Snum X (Snum=X), it transmits an ACK (Snum=X+1) indicating the correct reception and requesting the next data having a Snum X+1 (Snum=X+1) to the host apparatus.

Next, an ordinary implementation in conformity with the USB 3.1 Gen 2, which is the specification succeeding the USB 3.1 Gen 1, is explained. In the USB 3.1 Gen 2, as described above, even when a CRC value in a DPH is an erroneous value and when the newly-added Length Field Replica field has a correct value, only the DPH is discarded in the link layer and the corresponding DPP is sent to the protocol layer. Therefore, it is conceivable to provide a dedicated buffer in the protocol layer for the case in which a DPH is not transferred and only a DPP is transferred to the protocol layer due to an error in the DPH. This dedicated buffer differs from a data buffer for a specific endpoint that is already provided in the protocol layer. Further, it is conceivable to provide a control circuit in the protocol layer that, after a DPH is resent, rearranges the storing order of the already-received DPP and the resent DPH having the same Snum. Therefore, when an ordinary implementation is made in conformity with the USB 3.1 Gen 2, the circuit size increases due to the addition of the above-described buffer and the control circuit. For example, it is considered that in a rough estimate, flip-flops or a RAM (Random Access Memory) for storing data equivalent to at least one packet (1,024 bytes) is necessary for the data buffer.

Figure 14:
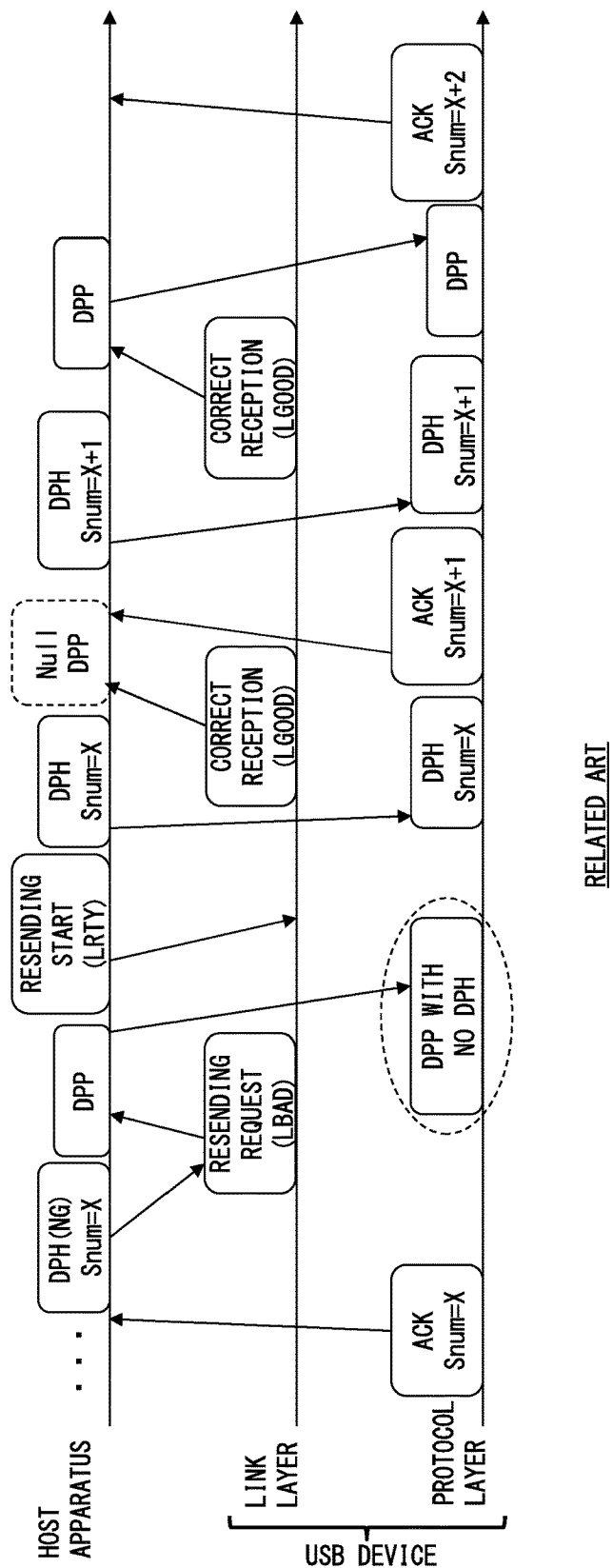
FIG. 14 is a sequence diagram showing a process flow in each layer when a predetermined error occurs in a DPH in ordinary implementation according to USB 3.1 Gen 2.

Next, a process flow in each layer that is performed when a CRC error occurs in a DPH in an ordinary implementation in conformity with the USB 3.1 Gen 2 is explained with reference to a sequence diagram shown in FIG. 14. In this example, an operation that starts in the middle of a Bulk OUT transfer in conformity with the USB 3.1 Gen 2 is shown. That is, it is assumed that a USB device has already received DPs correctly up to a DP having a Snum X-1 (Snum=X-1) transmitted from a host apparatus.

Therefore, the host apparatus in conformity with the USB 3.1 Gen 2 transmits a DPH and a DPP having a Snum X (Snum=X) to the USB device. Then, the USB device in conformity with the USB 3.1 Gen 2 receives the DPH having the Snum X (Snum=X) in its physical layer and link layer. It is assumed that at this point, a CRC error is detected in the received DPH and the Length Field Replica field in the received DPH has a correct value. Note that the correct value means that the Length Field Replica field has a value within a certain range. After that, the link layer in the USB 3.1 Gen 2 discards the DPH and transfers the DPP to the protocol layer. Further, the link layer transmits an LBAD command to the host apparatus.

The protocol layer stores the received DPP into the above-described added buffer. Further, the host apparatus transmits an LRTY command upon receiving the LBAD command, and then transmits the DPH having the Snum X (Snum=X) to the USB device again. Note that the resent DPH (i.e., retransmitted DPH) is referred to as "a DPH with no DPP" (or "a null DPP") hereinafter. When the received "DPH with no DPP" is correct, the link layer of the USB device transmits an LGOOD command to the host apparatus and transfers the "DPH with no DPP" having the Snum X (Snum=X) to the protocol layer. When the protocol layer of the USB device correctly receives the DPH having the Snum X (Snum=X), it rearranges the order of the already-received DPP and the currently-received DPH having the Snum X (Snum=X) and stores them into the data buffer by using the above-described control circuit. After that, the protocol layer transmits an ACK (Snum=X+1) indicating the correct reception and requesting the next data having a Snum X+1 (Snum=X+1) to the host apparatus.

As described above, in the case where an ordinary implementation is made in conformity with the USB 3.1 Gen 2, when a predetermined error occurs, the above-described problem could occur. Accordingly, embodiments for solving the above-described problem are explained hereinafter.

First Embodiment

Figure 1:
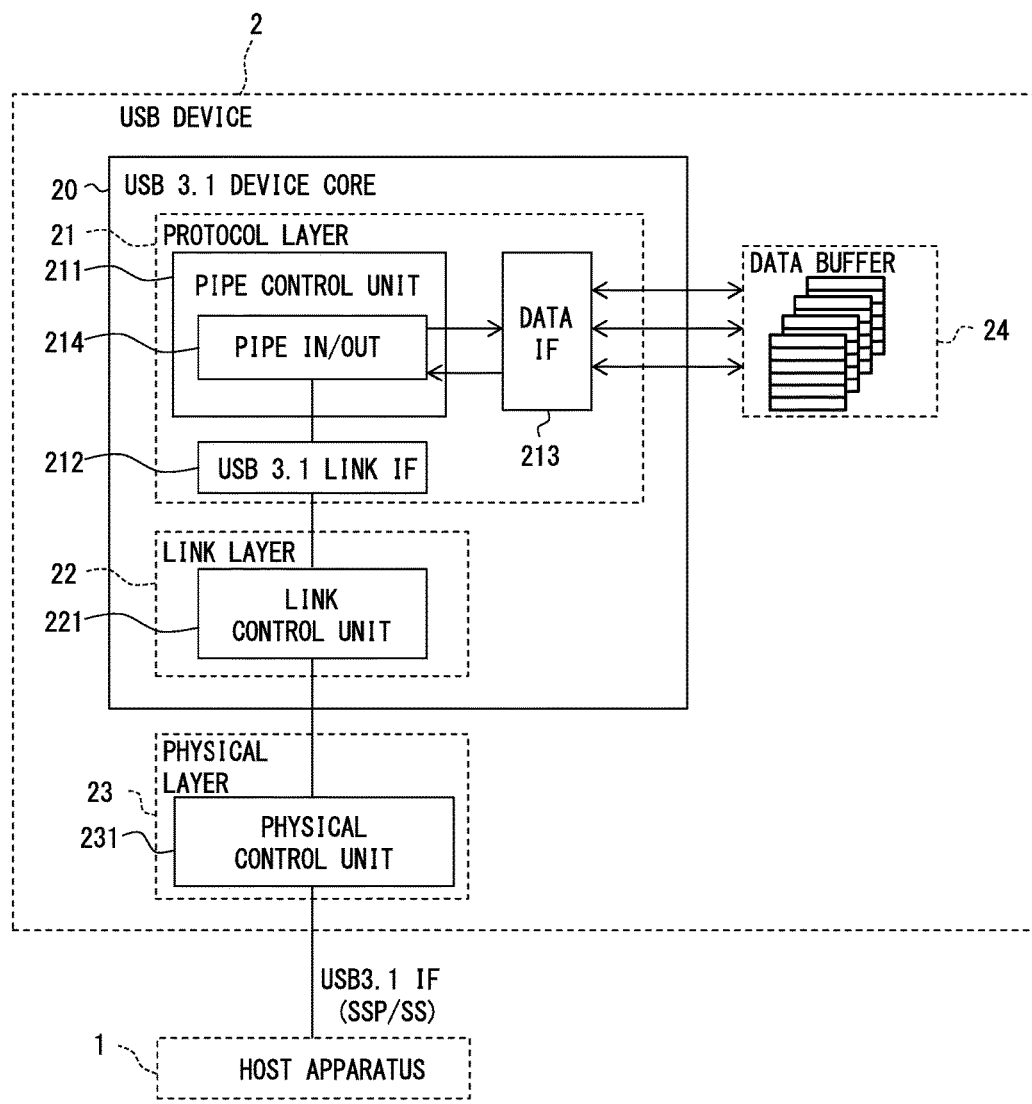
FIG. 1 is a block diagram showing a configuration of a host apparatus and a USB device according to a first embodiment.

FIG. 1 is a block diagram showing a configuration of an apparatus 1 and a device 2 according to a first embodiment. The apparatus 1 is a semiconductor device having a host function in conformity with the USB 3.1 Gen 2 specification (hereinafter referred to as "host apparatus"). Alternatively, the apparatus 1 may be a computer or the like. The device 2 is a semiconductor device having a peripheral function in conformity with the USB 3.1 Gen 2 specification (hereinafter reffered to as "USB device"). It is assumed that the apparatus 1 is connected with the device 2 through a USB 3.1 IF. Note that the configuration including the apparatus 1 and the device 2 can also be called a "data transfer system 1000".

The USB device 2 includes a device core 20 including a protocol layer 21 and a link layer 22, a data buffer 24, and a physical layer 23. Note that the link layer 22 is an example of the first processing unit and the protocol layer 21 is an example of the second processing unit. Note that the first processing unit may correspond to the physical layer 23 and the link layer 22.

The physical layer 23 includes a physical control unit 231. The physical control unit 231 conforms to the USB 3.1 Gen 2 specification and controls transmission/reception of data to/from the host apparatus 1 in a physical layer level. The link layer 22 includes a link control unit 221. The link control unit 221 conforms to the USB 3.1 Gen 2 specification and controls transmission/reception of data to/from the physical layer 23 and to/from the protocol layer 21. Further, the link control unit 221 controls packet processing in a link layer level for data to be transmitted/received. The protocol layer 21 includes a pipe control unit 211, a link IF 212, and a data IF 213. The link IF 212 conforms to the USB 3.1 Gen 2 specification and transmits/receives data to/from the link layer 22. The data IF 213 transmits/receives data to/from the data buffer 24. The pipe control unit 211 includes a pipe IN/OUT 214. The pipe IN/OUT 214 conforms to the USB 3.1 Gen 2 specification and controls packet processing in a protocol layer level.

The data buffer 24 is a storage area for storing data that is transmitted/received to/from the host apparatus 1. For example, a DPH and a DPP are stored in the data buffer 24.

Figure 2:
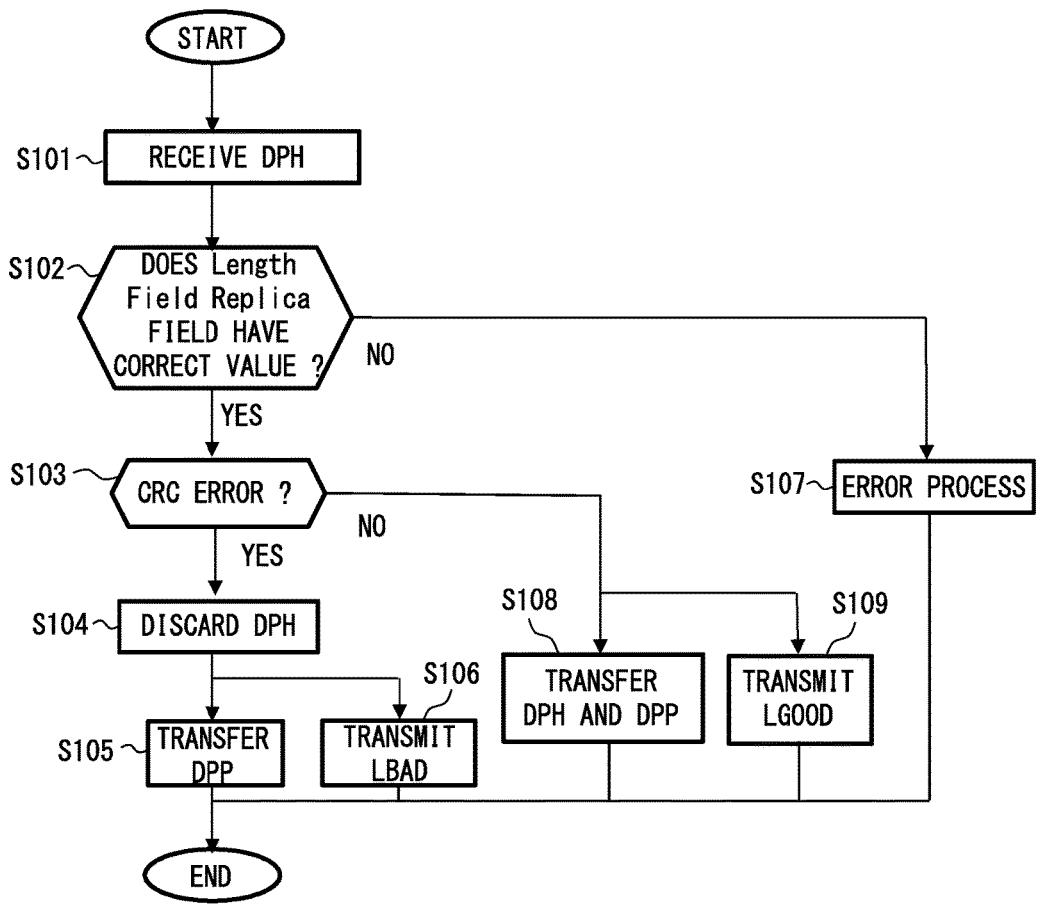
FIG. 2 is a flowchart for explaining a flow of a DPH receiving process in a link layer according to the first embodiment.

FIG. 2 is a flowchart for explaining a flow of a DPH receiving process in the link layer 22 according to the first embodiment.

Firstly, the link control unit 221 of the link layer 22 receives a DPH from the host apparatus 1 through the physical layer 23 (S101). Next, the link control unit 221 determines whether or not a Length Field Replica field has a correct value (S102). Note that when the field has a correct value, i.e., a value within a certain range, the link control unit 221 determines whether or not the received DPH has a CRC error (S103). When the received DPH has a CRC error, the link control unit 221 discards the received DPH (S104). That is, the link layer 22 does not transfer the received DPH to the protocol layer 21 of the subsequent stage. Further, the link control unit 221 transfers a DPP that is received subsequent to the DPH to the protocol layer 21 (S105). That is, the link layer 22 does not discard the DPP having the same Snum as that of the discarded DPH and transfers that DPP to the protocol layer 21. Further, the link layer 22 transmits an LBAD command to the host apparatus 1 through the physical layer 23 (S106).

When the Length Field Replica field does not have a correct value in the step 5102, the link control unit 221 performs a predetermined error process (S107). Note that this error process is well-known and therefore its detailed explanation is omitted. Note that in the step S102, it is assumed that determinations on errors other than the CRC error, i.e., determinations other than the determination whether or not the Length Field Replica field has a correct value are performed. Further, when some kind of error other than the CRC error is detected, the error process in the step S107 is performed.

Further, in the step S103, when the received DPH does not has the CRC error, i.e., when the CRC has a correct value, the link control unit 221 transfers the received DPH and the subsequently-received DPP to the protocol layer 21 of the subsequent stage (S108). At the same time, the link layer 22 transmits an LGOOD command to the host apparatus 1 through the physical layer 23 (S109).

Figure 3:
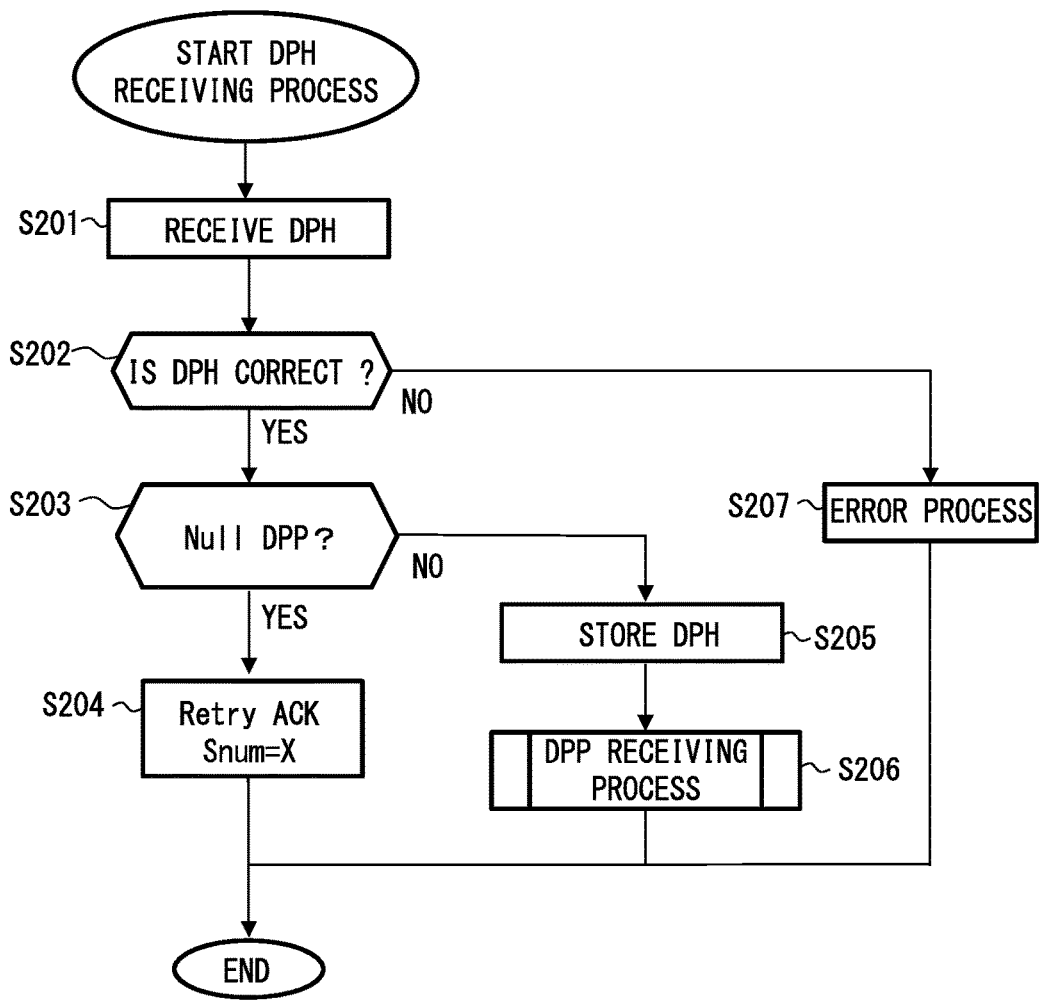
FIG. 3 is a flowchart for explaining a flow of a DPH receiving process in a protocol layer according to the first embodiment.

FIG. 3 is a flowchart for explaining a flow of a DPH receiving process in the protocol layer 21 according to the first embodiment. Firstly, the protocol layer 21 receives a DPH from the link layer 22 (S201). Next, the protocol layer 21 determines whether or not the received DPH is correct in the link IF 212 (S202). When the DPH is correct, the link IF 212 determines whether or not the received DPH is a null DPP (S203). That is, the protocol layer 21 determines whether or not there is a DPP subsequent to the received DPH. In other words, the protocol layer 21 determines whether or not there is a DPP having the same Snum as that of the received DPH immediately subsequent to the received DPH. In the step S203, when the received DPH is a null DPP, the protocol layer 21 transmits a Retry ACK (Snum=X) to the host apparatus 1 through the link layer 22 and the physical layer 23 (S204). Note that the Retry ACK indicates (or corresponds to) a DP resending request in the protocol layer.

In the step S203, when the link IF 212 determines that the received DPH is not a null DPP, the protocol layer 21 stores the received DPH into the data buffer 24 (S205) and performs a DPP receiving process (which is described later) (S206). Further, in the step S202, when the link IF 212 determines that the DPH is not correct, the protocol layer 21 performs a predetermined error process (S207).

Figure 4:
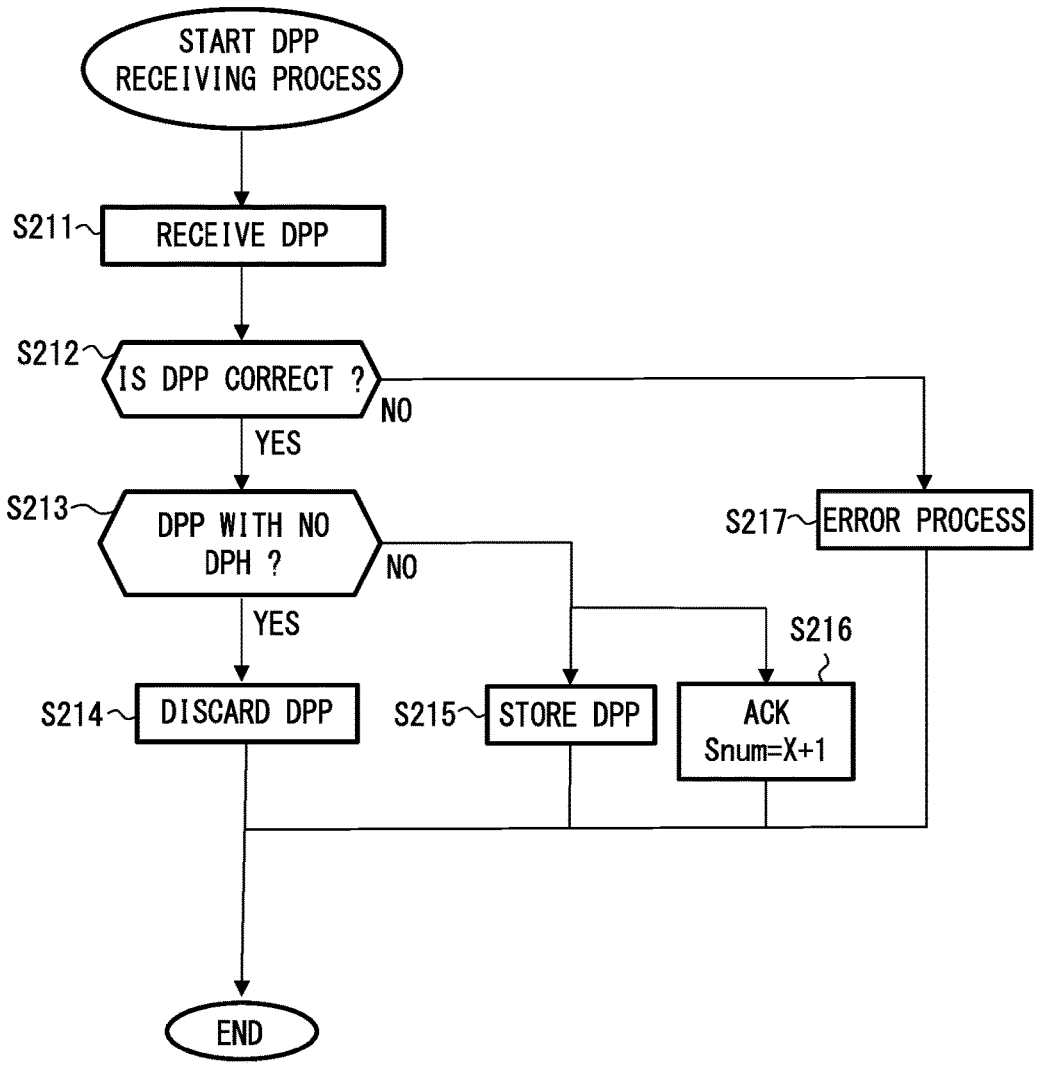
FIG. 4 is a flowchart for explaining a flow of a DPP receiving process in the protocol layer according to the first embodiment.

FIG. 4 is a flowchart for explaining a flow of a DPP receiving process in the protocol layer 21 according to the first embodiment. It is assumed that the processes in FIG. 4 may be performed as sub-processes included in the step S206 in FIG. 3 in some cases, and may be independently performed without performing the DPH receiving process in other cases.

Firstly, the protocol layer 21 receives a DPP from the link layer 22 (S211). Next, the protocol layer 21 determines whether or not the received DPP is correct in the link IF 212 (S212). When the received DPP is correct, the link IF 212 determines whether or not the DPP is a DPP with no DPH (S213). That is, the protocol layer 21 determines whether or not it has already received the DPH having the same Snum as that of the currently received DPP before receiving the currently received DPP, or determines whether or not it has discarded the DPH having the same Snum as that of the currently received DPP in the past. When the protocol layer 21 determines that the DPP is a DPP with no DPH in the step S213, the protocol layer 21 discards the received DPP (S214). For example, the protocol layer 21 does not store the received DPP into the data buffer 24. Alternatively, although the protocol layer 21 stores the received DPP into the data buffer 24, it makes the stored data rewritable so that it can be overwritten when the next data is stored.

When the link IF 212 determines that the DPP is not a DPP with no DPH in the step S213, i.e., when the DPH having the same Snum has already received and stored immediately before receiving the currently received DPP, the protocol layer 21 stores the received DPP into the data buffer 24 (S215). At the same time, the protocol layer 21 transmits an ACK (Snum=X+1) to the host apparatus 1 through the link layer 22 and the physical layer 23 (S216).

Further, when the link IF 212 determines that the received DPP is not correct in the step S212, the protocol layer 21 performs the predetermined error process (S217).

Figure 5:
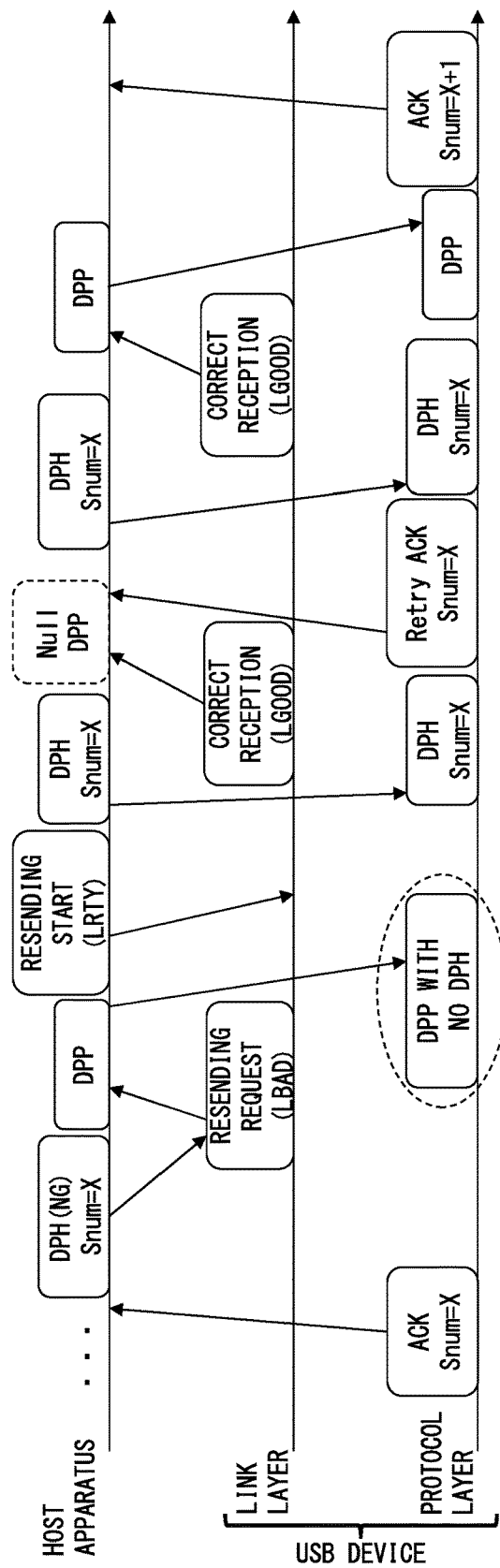
FIG. 5 is a sequence diagram showing a process flow in each layer when a predetermined error occurs in a DPH according to the first embodiment.

FIG. 5 is a sequence diagram showing a process flow in each layer when a CRC error occurs in a DPH according to the first embodiment. In this example, an operation that starts in the middle of a Bulk OUT transfer in conformity with the USB 3.1 Gen 2 is shown. That is, it is assumed that the USB device 2 has already received DPs correctly up to a DP having a Snum X−1 (Snum=X−1) transmitted from the host apparatus 1. Note that this assumption is also applied to all the sequence diagrams shown below.

Therefore, the host apparatus 1 transmits a DPH and a DPP having a Snum X (Snum=X) to the USB device 2. Then, the USB device 2 receives the DPH having the Snum X (Snum=X) in its physical layer 23 and link layer 22. It is assumed that at this point, a CRC error is detected in the received DPH and the Length Field Replica field in the received DPH has a correct value. After that, the link layer 22 discards the DPH and transfers the DPP to the protocol layer 21. Further, the link layer 22 transmits an LBAD command to the host apparatus 1 through the physical layer 23.

Since the received DPP is correct and is a DPP with no DPH, the protocol layer 21 discards the received DPP. Further, the host apparatus 1 transmits an LRTY command upon receiving the LBAD command, and then transmits the "DPH with no DPP" having the Snum X (Snum=X) to the USB device 2 again.

Since the received "DPH with no DPP" is correct, the link layer 22 transmits an LGOOD command to the host apparatus 1 and transfers the "DPH with no DPP" having the Snum X (Snum=X) to the protocol layer 21. Upon receiving the "DPH with no DPP" having the Snum X (Snum=X), the protocol layer 21 stores the DPH into the data buffer 24. At the same time, the protocol layer 21 transmits a Retry ACK (Snum=X) to the host apparatus 1 through the link layer 22 and the physical layer 23. In response to the Retry ACK (Snum=X), the host apparatus 1 transmits the DPH and DPP having the Snum X (Snum=X) to the USB device 2. In this example, it is assumed that the DPH and DPP are correctly received.

Therefore, the link layer 22 does not detect a CRC error in the received DPH, and hence transfers the DPH and DPP having the Snum X (Snum=X) to the protocol layer 21 as it is and transmits an LGOOD command to the host apparatus 1. The protocol layer 21 stores the received DPH and DPP into the data buffer 24 and transmits an ACK (Snum=X+1) to the host apparatus 1.

As described above, in the first embodiment, when a DPP with no DPH is received in the protocol layer, the DPP is discarded without storing it and a Retry ACK TP (Transaction Packet), which is a resending request, is transmitted to the host apparatus when a DP is correctly received the next time. By doing so, it is possible to reliably receive a DP.

Therefore, the DPP storage area, which would otherwise be temporarily necessary when a DPP with no DPH is received, becomes unnecessary, thus making it possible to reduce the circuit size by an amount equivalent to the DPP storage area. Further, the storage control, which would otherwise be necessary to store the temporarily-stored DPP into the appropriate storage area based on information that is obtained when the next DPH is received, becomes unnecessary. Therefore, it is possible to reduce the circuit size by an amount corresponding to the storage control. Further, the first embodiment is useful because it can be applied to a host apparatus 1 in conformity with the USB 3.1 Gen 2 specification without modifying the host apparatus 1.

Note that the first embodiment can be expressed as follows. That is, a USB device includes: a first processing unit configured to, when a predetermined error is included in a first header of a first packet received from a host apparatus, discard the first header and transmit a first payload of the first packet to a subsequent stage; and a second processing unit configured to discard the first payload received from the first processing unit and transmit a first packet resending request (e.g., a Retry ACK) to the host apparatus. By this configuration, it is possible to prevent or reduce an increase in the circuit size as described above.

Further, the first processing unit according to the first embodiment is configured to, when the predetermined error is included in the first header, transmit a first header resending request (e.g., an LBAD command) to the host apparatus, receive a second header of a second packet with no payload (e.g., a DPH with no DPP) that is transmitted from the host apparatus in response to the first header resending request, and transmit the second header to the second processing unit when the received second header is correct. Further, the second processing unit is configured to, when the second header is received from the first processing unit, transmit the first packet resending request to the host apparatus. By this configuration, it is possible to prevent or reduce an increase in the circuit size while effectively utilizing existing commands in conformity with the USB 3.1 Gen 2 specification.

Further, the first processing unit is preferably a link layer in conformity with the USB (Universal Serial Bus) 3.1 Gen 2 and the second processing unit is preferably a protocol layer in conformity with the USB 3.1 Gen 2.

Further, the predetermined error means that a CRC of the first header has an erroneous value and a Length Field Replica field has a correct value. In this way, it is possible to flexibly change the specification from the USB 3.1 Gen 1 to the USB 3.1 Gen 2.

Second Embodiment

A second embodiment is a modified example of the above-described first embodiment. That is, when the first processing unit according to the second embodiment discards the first header, the first processing unit transmits a pseudo correct reception response to the host apparatus. Further, the second processing unit discards the first payload and transmits a first packet resending request to the host apparatus. In this way, it is possible to reduce the data resending processing time compared to the first embodiment.

Figure 6:
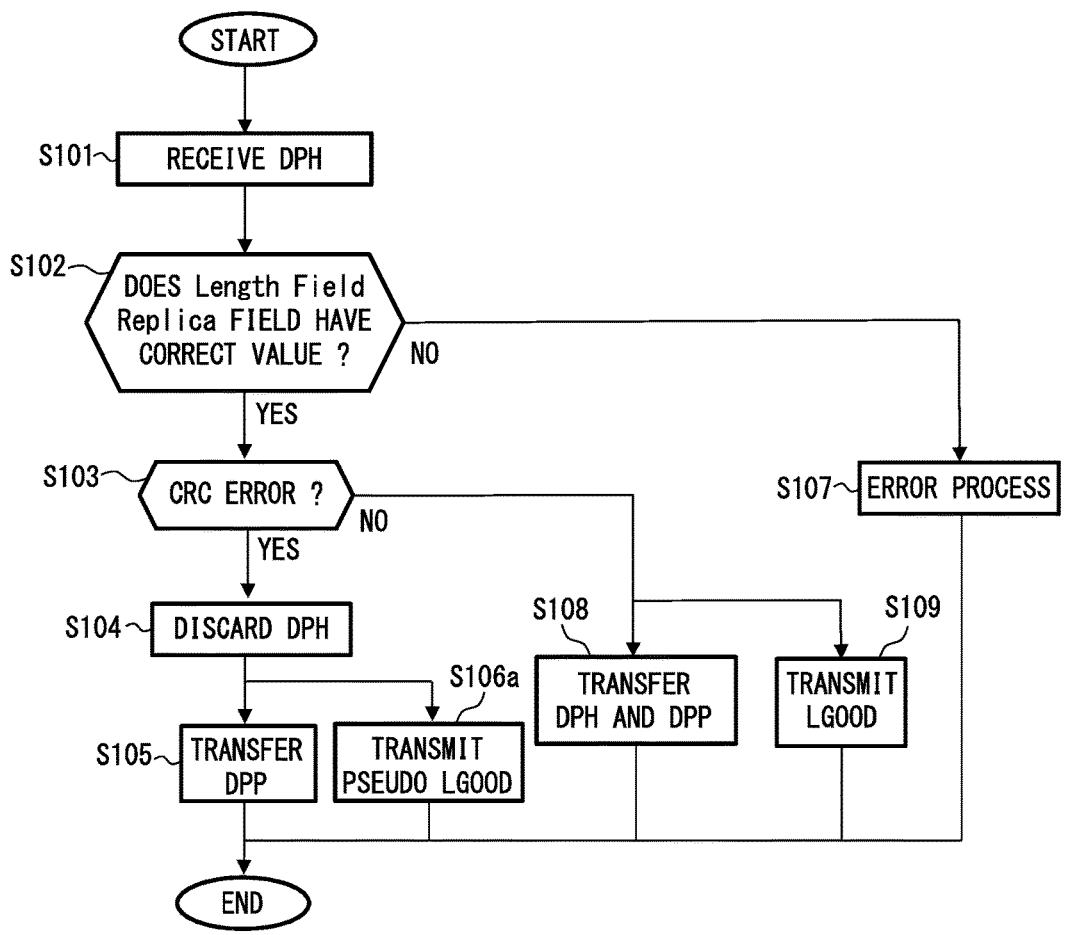
FIG. 6 is a flowchart for explaining a flow of a DPH receiving process in a link layer according to a second embodiment.

FIG. 6 is a flowchart for explaining a flow of a DPH receiving process in the link layer 22 according to the second embodiment. In the flowchart shown in FIG. 6, a step S106a is substituted for the step S106 in the flowchart shown in FIG. 2. The other steps are similar to those in FIG. 2 and therefore their explanations are omitted as appropriate.

Specifically, after the link control unit 221 discards a DPH including a predetermined error (S104), the link control unit 221 transmits a pseudo LGOOD command to the host apparatus 1 (S106a) while transferring the subsequent DPP to the protocol layer 21 (S105). It is assumed that the content of the pseudo LGOOD command is similar to that of an ordinary LGOOD command. In other words, the link layer 22 transmits an LGOOD command instead of the LBAD command to the host apparatus 1 in the step S106a.

Figure 7:
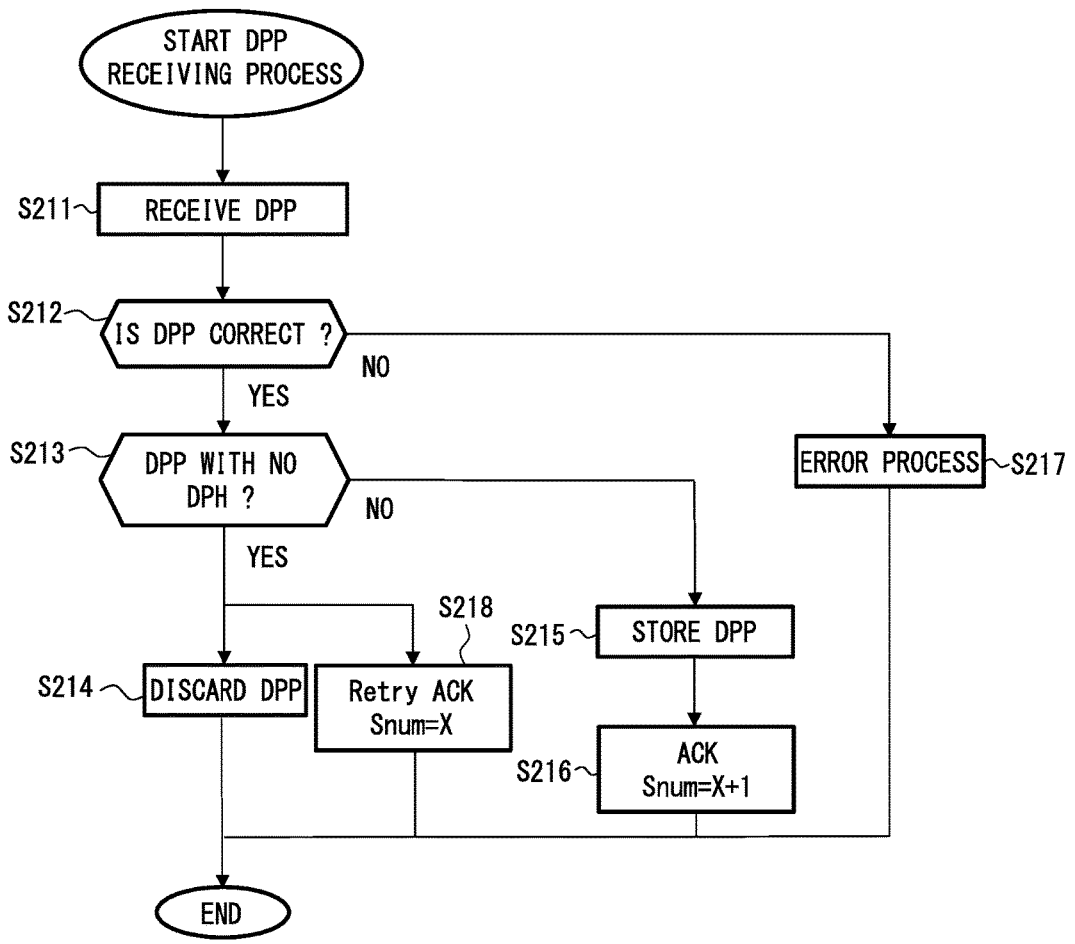
FIG. 7 is a flowchart for explaining a flow of a DPP receiving process in a protocol layer according to the second embodiment.

FIG. 7 is a flowchart for explaining a flow of a DPP receiving process in the protocol layer 21 according to the second embodiment. Compared to FIG. 4, FIG. 7 includes execution in a step S218 which is performed in parallel with the step S214. The other steps are similar to those in FIG. 2 and therefore their explanations are omitted as appropriate.

Specifically, when it is determined that the DPP is a DPP with no DPH in the link IF 212 in the step S213, the protocol layer 21 discards the received DPP (S214) and transmits a Retry ACK (Snum=X) to the host apparatus 1 through the link layer 22 and the physical layer 23 (S218).

Figure 8:
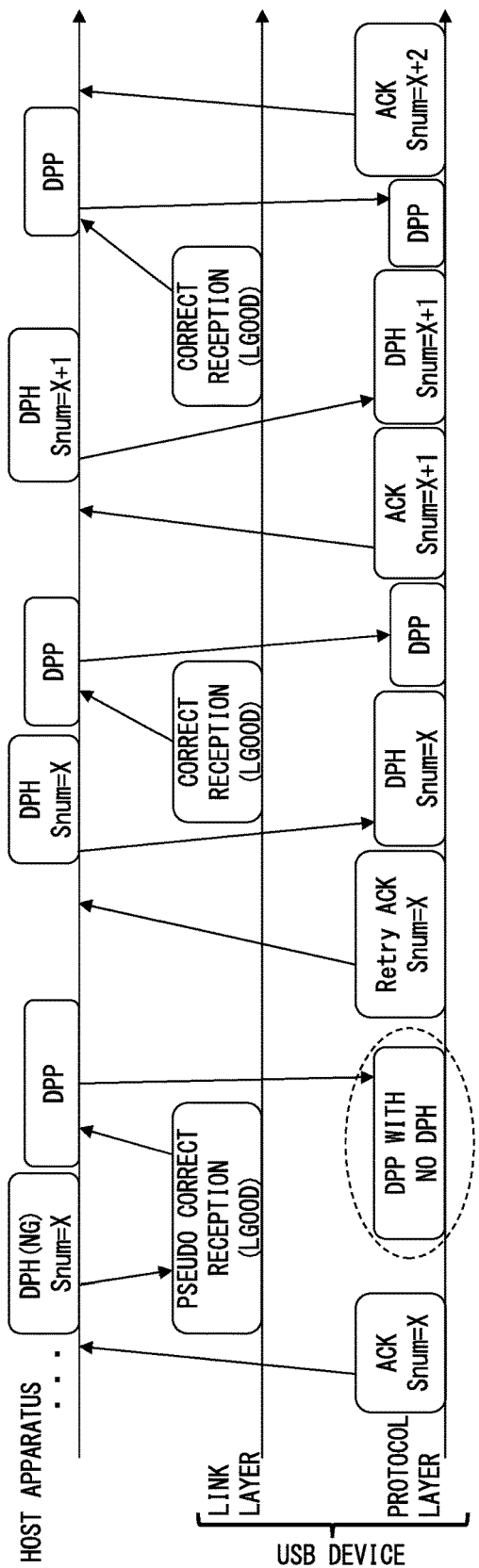
FIG. 8 is a sequence diagram showing a process flow in each layer when a predetermined error occurs in a DPH according to the second embodiment.

FIG. 8 is a sequence diagram showing a process flow in each layer when a CRC error occurs in a DPH according to the second embodiment. Firstly, the host apparatus 1 transmits a DPH and a DPP having a Snum X (Snum=X) to the USB device 2. Then, the USB device 2 receives the DPH having the Snum X (Snum=X) in its physical layer 23 and link layer 22. It is assumed that at this point, a CRC error is detected in the received DPH and the Length Field Replica field in the received DPH has a correct value. After that, the link layer 22 discards the DPH and transfers the DPP to the protocol layer 21. Further, the link layer 22 transmits an LGOOD command instead of the LBAD command to the host apparatus 1 through the physical layer 23.

The protocol layer 21 discards the DPP received from the link layer 22. At the same time, the protocol layer 21 transmits a Retry ACK (Snum=X) to the host apparatus 1 through the link layer 22 and the physical layer 23. In response to the Retry ACK (Snum=X), the host apparatus 1 transmits the DPH and DPP having the Snum X (Snum=X) to the USB device 2. The subsequent processes are similar to those in FIG. 5.

That is, in the second embodiment, the link layer 22 transmits the LGOOD command, which is a correct response (i.e., a response indicating correct reception), instead of the LBAD command, which should be transmitted under normal circumstances. Further, when the protocol layer 21 receives a DPP with no DPH, it transmits a Retry ACK (Snum=X) immediately. Therefore, the host apparatus 1 can resend the DPH and DPP having the Snum X (Snum=X) without transmitting the LRTY command and the "DPH with no DPP". Therefore, compared to the first embodiment, it is possible to reduce the time required for the process for transmitting and receiving the LRTY command and the "DPH with no DPP". Further, similar to the first embodiment, the second embodiment is useful because it can be applied to a host apparatus 1 in conformity with the USB 3.1 Gen 2 specification without modifying the host apparatus 1.

Further, compared to the first embodiment, the second embodiment can further improve the transfer performance by transmitting the Retry ACK in the protocol layer without transmitting the LBAD command from the link layer and hereby without waiting for the LRTY command of the host apparatus and the resent DPH with no DPP.

Third Embodiment

A third embodiment is another modified example of the above-described first embodiment. That is, when the host apparatus according to the third embodiment receives the first header resending request from the first processing unit, the host apparatus suspends the transmission of the first payload and starts the transmission of the second packet. In this way, compared to the first embodiment, it is possible to reduce the resending time at the occurrence of the predetermined error.

Figure 9:
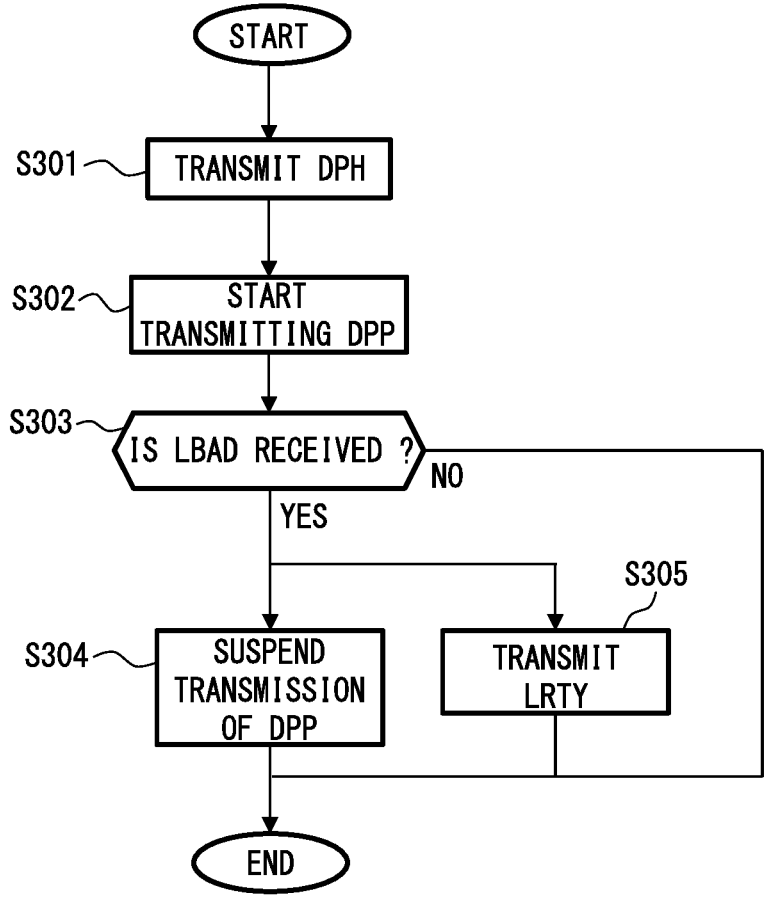
FIG. 9 is a flowchart for explaining a flow of a DP transmitting process in a host apparatus according to a third embodiment.

FIG. 9 is a flowchart for explaining a flow of a DP transmitting process in the host apparatus 1 according to the third embodiment. Firstly, the host apparatus 1 transmits a DPH to the USB device 2 (S301). Next, the host apparatus 1 starts transmitting a DPP having the same Snum as that of the transmitted DPH (S302). After that, the host apparatus 1 determines whether or not it has received an LBAD command from the USB device 2 during the transmission of the DPP (S303). When the host apparatus 1 has received the LBAD command, the host apparatus 1 suspends the transmission of the DPP during its transmission process (S304), and at the same time, transmits an LRTY command to the USB device 2 (S305). After that, the host apparatus 1 sends the DPH and DPP again.

Figure 10:
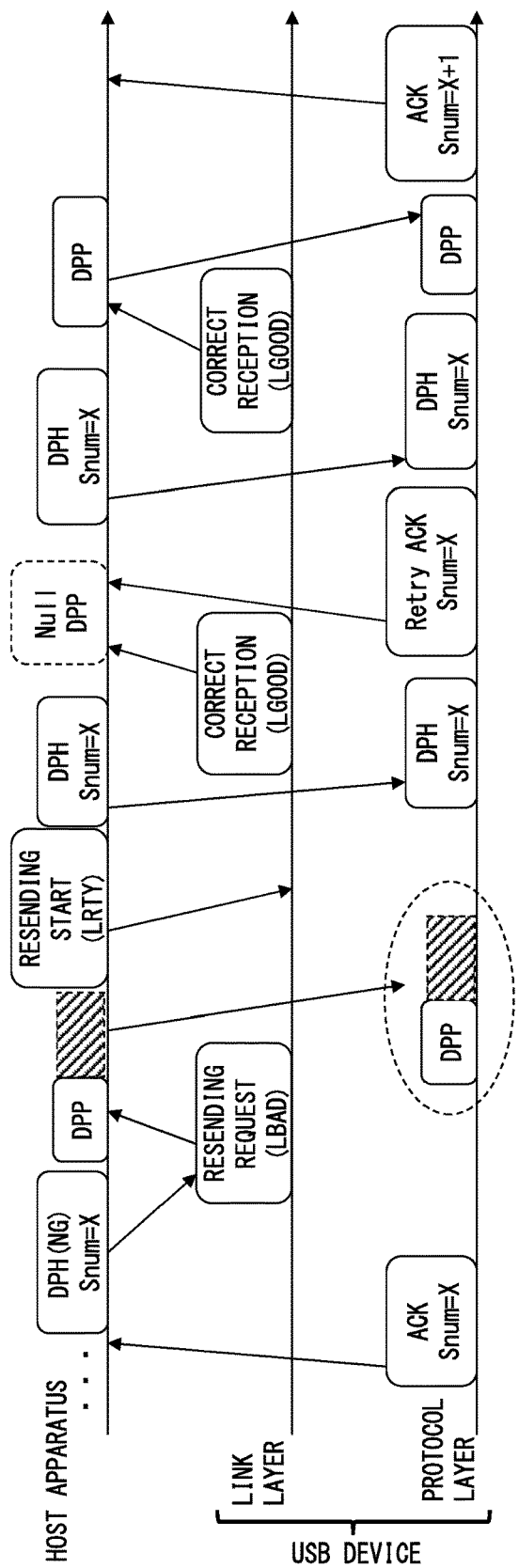
FIG. 10 is a sequence diagram showing a process flow in each layer when a predetermined error occurs in a DPH according to the third embodiment.

FIG. 10 is a sequence diagram showing a process flow in each layer when a CRC error occurs in a DPH according to the third embodiment. Firstly, the host apparatus 1 transmits a DPH and a DPP having a Snum X (Snum=X) to the USB device 2. It is assumed that the DPP is being transmitted. Then, the USB device 2 receives the DPH having the Snum X (Snum=X) in its physical layer 23 and link layer 22. It is assumed that at this point, a CRC error is detected in the received DPH and the Length Field Replica field in the received DPH has a correct value. After that, the link layer 22 discards the DPH and starts transferring the DPP to the protocol layer 21. Further, the link layer 22 transmits an LBAD command to the host apparatus 1 through the physical layer 23.

At this point, upon receiving the LBAD command, the host apparatus 1 suspends the transmission of the DPP having the Snum X (Snum=X) during its transmission process. Then, the host apparatus 1 transmits an LRTY command and subsequently transmits the DPH with no DPP having the Snum X (Snum=X) to the USB device 2 again. The subsequent processes are similar to those in FIG. 5.

As described above, the DPP, which is being transmitted, becomes unnecessary when the LBAD command is received. Therefore, it is possible to improve the transfer performance by suspending the transmission of the DPP immediately after receiving the LBAD command and thereby advancing (i.e., expediting) the transmission of the LRTY command and the resending operation of the DPH.

Fourth Embodiment

Figure 11:
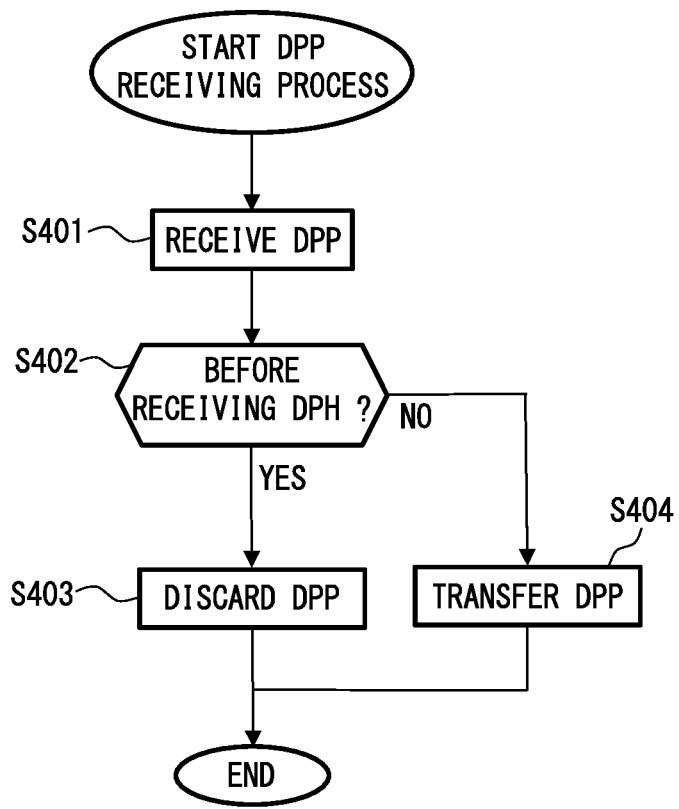
FIG. 11 is a flowchart for explaining a flow of a DPP receiving process in a link layer according to a fourth embodiment.

In a fourth embodiment, a process that can be applied to the link layer when the receiving order of a DPH and a DPP having the same Snum is reversed is explained. FIG. 11 is a flowchart for explaining a flow of a DPP receiving process in the link layer 22 according to the fourth embodiment. Firstly, the link layer 22 receives a DPP (S401). Next, the link control unit 221 determines whether or not a DPH having the same Snum as that of the received DPP has not been received yet (S402). When the DPH has not been received yet, the link layer 22 discards the DPP (S403). When the DPH has been already received, the link layer 22 transfers the DPP to the protocol layer 21.

Figure 12:
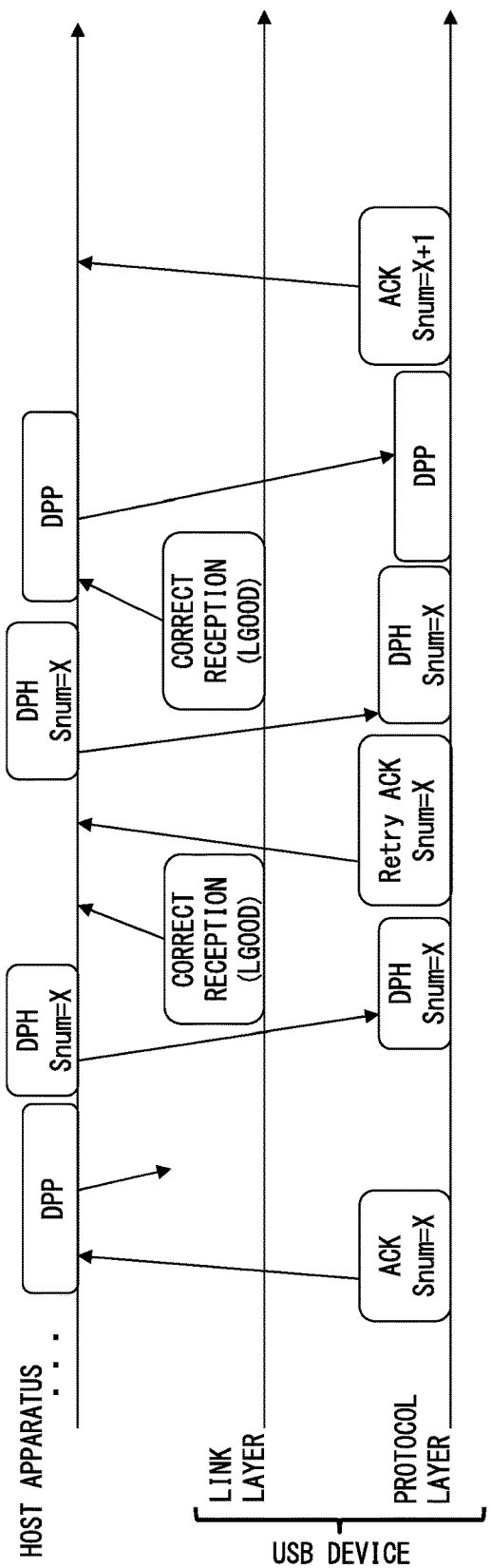
FIG. 12 is a sequence diagram showing a flow in each layer in a case where the receiving order of a DPH and a DPP is reversed according to the fourth embodiment.

FIG. 12 is a sequence diagram showing a process flow in each layer in a case where the receiving order of a DPH and a DPP is reversed according to the fourth embodiment. Firstly, the host apparatus 1 transmits a DPP and a DPH having the Snum X (Snum=X) to the USB device 2 in the order of the DPP and DPH. The link layer 22 receives the DPP from the host apparatus 1 through the physical layer 23. At this point, since the link layer 22 has not received the DPH having the Snum X (Snum=X) yet, it discards the received DPP. After that, the link layer 22 receives the DPH having the Snum X (Snum=X). Since the received DPH is correct, the link layer 22 transfers the received DPH to the protocol layer 21 and transmits an LGOOD command to the host apparatus 1 through the physical layer 23. Although the protocol layer 21 correctly receives the DPH from the link layer 22, it determines that the received DPH is a null DPP and hence transmits a Retry ACK (Snum=X) to the host apparatus 1. The subsequent processes are similar to those in FIG. 5.

Note that in FIG. 12, the order of the transmission by the host apparatus 1 is the order of the DPP and DPH. However, even when the transmitting order is correct, i.e., is the order of the DPH and DPP, the above-described process can be applied when the receiving order of them is reversed due to abnormal communication or the like.

Further, in FIG. 12, even when a DPH that is transmitted subsequent to the first DPP has a predetermined error, the link layer 22 transmits an LBAD command to the host apparatus 1. However, nothing is sent from the link layer 22 to the protocol layer 21. In such a case, similar to the first embodiment, a DPH with no DPP is transmitted from the host apparatus 1. After that, the same processes as those in FIG. 5 are performed.

Note that the fourth embodiment can be expressed as the following supplementary note.

(Supplementary Note) A USB device including:
a first processing unit configured to, when a first payload of a first packet is received from a host apparatus, determine whether or not a first header of the first packet has been already received, discard the first payload when the first processing unit determines that the first header has not received yet, and transmit the first header to a subsequent stage when the first header of the first packet received from the host apparatus is correct; and
a second processing unit configured to receive the first header from the first processing unit, and transmit a first packet resending request to the host apparatus when the first payload has not been received yet.

Further, although the present disclosure is explained as a hardware configuration in the above-described embodiments, the present disclosure is not limited to the hardware configuration. The present disclosure can be implemented by implementing an arbitrary process by having a processor such as a CPU (Central Processing Unit) execute a computer program.

In the above-described examples, the program can be stored and provided to a computer using any type of non-transitory computer readable media. Non-transitory computer readable media include any type of tangible storage media. Examples of non-transitory computer readable media include magnetic storage media (such as floppy disks, magnetic tapes, hard disk drives, etc.), optical magnetic storage media (e.g. magneto-optical disks), CD-ROM (compact disc read only memory), CD-R (compact disc recordable), CD-R/W (compact disc rewritable), DVD (Digital Versatile Disc), BD (Blue-ray (registered trademark) Disc), and semiconductor memories (such as mask ROM, PROM (programmable ROM), EPROM (erasable PROM), flash ROM, RAM (random access memory), etc.). The program maybe provided to a computer using any type of transitory computer readable media. Examples of transitory computer readable media include electric signals, optical signals, and electromagnetic waves. Transitory computer readable media can provide the program to a computer via a wired communication line (e.g. electric wires, and optical fibers) or a wireless communication line.

The present disclosure made by the inventors of the present application has been explained above in a concrete manner based on embodiments. However, the present disclosure is not limited to the above-described embodiments, and needless to say, various modifications can be made without departing from the spirit and scope of the present disclosure.

The first, second, third and fourth embodiments can be combined as desirable by one of ordinary skill in the art.

While the invention has been described in terms of several embodiments, those skilled in the art will recognize that the invention can be practiced with various modifications within the spirit and scope of the appended claims and the invention is not limited to the examples described above.

Further, the scope of the claims is not limited by the embodiments described above.

Furthermore, it is noted that, Applicant's intent is to encompass equivalents of all claim elements, even if amended later during prosecution.

What is claimed is:
1. A USB device comprising:
a first processing unit configured to, when a predetermined error is included in a first header of a first packet received from a host apparatus, discard the first header and transmit a first payload of the first packet to a subsequent stage; and
a second processing unit configured to discard the first payload received from the first processing unit and transmit a first packet resending request to the host apparatus.

2. The USB device according to claim 1, wherein
when the first processing unit discards the first header, the first processing unit transmits a pseudo correct reception response to the host apparatus, and
the second processing unit discards the first payload and transmits a first packet resending request to the host apparatus.

3. The USB device according to claim 1, wherein
the first processing unit is configured to, when the predetermined error is included in the first header, transmit a first header resending request to the host apparatus, receive a second header of a second packet with no payload that is transmitted from the host apparatus in response to the first header resending request, and transmit the second header to the second processing unit when the received second header is correct, and
the second processing unit is configured to, when the second header is received from the first processing unit, transmits the first packet resending request to the host apparatus.

4. A host apparatus configured to transmit the first packet to a USB device according to claim 3, wherein
when the host apparatus receives a first header resending request from the first processing unit, the host apparatus suspends transmission of the first payload and starts transmission of the second packet.

5. The host apparatus according to claim 4, wherein the host apparatus conforms to a USB (Universal Serial Bus) 3.1 Gen 2.

6. The USB device according to claim 1, wherein
the first processing unit is a link layer in conformity with a USB (Universal Serial Bus) 3.1 Gen 2, and
the second processing unit is a protocol layer in conformity with the USB 3.1 Gen 2.

7. The USB device according to claim 6, wherein the predetermined error means that a CRC of the first header has an erroneous value and a Length Field Replica field has a correct value.

8. A data transfer system comprising:
a host apparatus configured to transmit a first packet; and
a USB device configured to receive the first packet from the host apparatus, wherein
the USB device comprises:
a first processing unit configured to, when a predetermined error is included in a first header of the first packet, discard the first header and transmit a first payload of the first packet to a subsequent stage; and
a second processing unit configured to discard the first payload received from the first processing unit and transmit a first packet resending request to the host apparatus.

9. The data transfer system according to claim 8, wherein when the host apparatus receives a first header resending request from the first processing unit, the host apparatus suspends transmission of the first payload and starts transmission of a second packet with no payload.

10. A data transfer method for transferring data from a host apparatus to a USB device, comprising:
discarding, in a first processing unit of the USB device, when a predetermined error is included in a first header of a first packet received from the host apparatus, the first header and transmitting a first payload of the first packet to a subsequent stage; and
discarding, in a second processing unit which is the subsequent stage, the first payload received from the first processing unit and transmitting a first packet resending request to the host apparatus.

* * * * *